United States Patent
Ertler

(10) Patent No.: US 7,650,800 B2
(45) Date of Patent: Jan. 26, 2010

(54) FLOW SENSOR AND METHOD FOR MEASURING THE VOLUME AND/OR FLOW SPEED OF A MEDIUM

(75) Inventor: Werner Ertler, Neuenrade (DE)

(73) Assignee: VSE Volumentechnik GmbH (DE)

( * ) Notice: Subject to any disclaimer, the term of this patent is extended or adjusted under 35 U.S.C. 154(b) by 160 days.

(21) Appl. No.: 11/597,964

(22) PCT Filed: Jun. 6, 2005

(86) PCT No.: PCT/EP2005/006067

§ 371 (c)(1),
(2), (4) Date: Aug. 23, 2007

(87) PCT Pub. No.: WO2005/119185

PCT Pub. Date: Dec. 15, 2005

(65) Prior Publication Data

US 2008/0127746 A1 Jun. 5, 2008

(30) Foreign Application Priority Data

Jun. 4, 2004 (DE) ........................ 10 2004 027 387

(51) Int. Cl.
*G01F 15/00* (2006.01)
(52) U.S. Cl. .................................. 73/861.77
(58) Field of Classification Search .............. 73/861.77, 73/861.78, 861.79
See application file for complete search history.

(56) References Cited

U.S. PATENT DOCUMENTS

| | | | |
|---|---|---|---|
| 4,641,522 A | 2/1987 | Lopresti | |
| 5,184,519 A * | 2/1993 | Ciarelli et al. | 73/861.77 |
| 5,586,045 A * | 12/1996 | Box et al. | 702/100 |
| 6,363,795 B1 | 4/2002 | Bergqvist et al. | |
| 6,487,919 B1 * | 12/2002 | Edwards | 73/861.77 |

FOREIGN PATENT DOCUMENTS

| | | |
|---|---|---|
| DE | 25 54 466 | 6/1977 |
| DE | 40 42 397 | 7/1992 |
| DE | 296 12 946 | 9/1996 |
| EP | 0 053 575 | 6/1982 |
| EP | 0 642 001 | 3/1995 |
| EP | 0 741 279 | 11/1996 |

OTHER PUBLICATIONS

GMR Sensors Data Book, NVE Corporation, Eden Prairie, Minnesota, Apr. 28, 2003.

* cited by examiner

*Primary Examiner*—Jewel Thompson
(74) *Attorney, Agent, or Firm*—Salter & Michaelson

(57) ABSTRACT

A flow sensor comprises a measuring chamber, into which a medium may be introduced and then removed, the volume and/or flow speed of which is to be measured. Freely rotating measuring elements are mounted in the measuring chamber Furthermore, at least one sensor for the measurement of magnetic fields and/or changes in magnetic fields is provided and a circuit to which the output signals from the sensor(s) are supplied. The sensor(s) provide an output signal and supply the same to the circuit. The output signal varies periodically on each passage of a single tooth and a corresponding tooth gap on one of the measuring elements, between a minimum and a maximum value. Depending on the position of the tooth relative to the sensor(s) the output signal takes on a reproducible intermediate value. The circuit is embodied such as to convert the intermediate values into discrete values, representative of part volumes of the volumes pumped between two teeth.

20 Claims, 4 Drawing Sheets

FLOW SENSOR AND METHOD FOR MEASURING THE VOLUME AND/OR FLOW SPEED OF A MEDIUM

TECHNICAL FIELD

The invention relates to a flow rate sensor having a measuring chamber, into which a fluid, the volume and/or flow rate of which is to be measured, can be fed and then discharged, having measuring mechanism elements disposed in the measuring chamber and mounted in a freely rotatable manner, having at least one sensor for measuring magnetic fields and/or variations of magnetic fields, and having a circuit device, to which the output signals of the sensor or sensors are supplied.

The invention further relates to a method of measuring the volume and/or the rate of flow of a medium by means of a flow rate sensor, which comprises a measuring chamber having measuring mechanism elements disposed therein and mounted in a freely rotatable manner and having at least one sensor for measuring magnetic fields and/or variations of magnetic fields.

BACKGROUND OF THE INVENTION

Flow rate sensors are also known as volume sensors. Generally, they take the form of displacement meters. Examples of these are gear sensors, screw spindle meters, oval-wheel meters, cylindrical-piston meters or alternatively measuring turbines or proportioning gear pumps. They are used to measure a volume, a throughflow quantity or the rate at which a medium, here therefore a fluid, passes through the measuring instrument. The fluids may be liquids, pastes or gases.

In practice, flow rate sensors are often not measuring instruments in the narrower sense because the evaluation electronics are not part of the instrument but situated externally. Nevertheless, the term "flow rate measuring instrument" is often used and reference is also made to measuring chambers and measuring mechanism elements etc. The flow rate sensors are frequently also described as volume sensors, throughflow sensors, flow rate measuring instruments etc.

The volume sensors or flow rate sensors merely sense the throughflow or a throughflow volume and supply a signal to this evaluation unit or evaluation electronics, which only then produce a measured value therefrom. The expression "flow rate sensor" is used below. A confusion with specific structural elements in the instrument that are detectors or sensors in the narrower sense is avoided by use of the full designation.

A common feature of most flow rate sensors or volume sensors is that they scan the movement of a rotating gear wheel. In gear sensors, for example, two mutually meshing gear wheels are mounted in a freely rotatable manner. A medium (generally a fluid, such as a liquid or a gas) is fed to the two gear wheels, namely to the region where they are in mesh. The medium therefore passes into the chambers that are formed mutually in the tooth spaces of the two gear wheels. As a result of the following flow of the medium, the quantities situated in the chambers of the gear wheel are conveyed from the inlet side to the outlet side and by means of the movement of the teeth then set the gear wheels in rotation. The two gear wheels in said case rotate in opposite directions. In the housing surrounding the gear wheels a magnet is disposed, which builds up a magnetic field. This magnetic field is influenced by the rotating gear wheels. These changes of the magnetic field may be scanned by means of one or more suitable sensors.

In this case, each tooth of the gear wheel that passes under the sensor or sensors leads to a scannable pulse. From the number of these pulses it is then possible to determine the angle, through which the gear wheel was rotated, and/or how many revolutions the gear wheel has completed altogether in a specific period of time. From this information it is then possible to draw a conclusion about the quantity of fluid or of some other medium that has flowed through the flow rate sensor, or to determine the rate of flow of the fluid. Naturally, it is possible conversely, in terms of closed-loop control, to define in a closed-loop control circuit a specific setpoint value for the quantity of the medium to be conveyed or for the rate of flow, which the flow rate sensor together with a pump then adjusts accordingly.

For some time now, such instruments have been successfully marketed and are already known for example from DE 25 54 466 C3. There is in particular a demand for flow rate sensors, which are also capable of extremely precise measurement of small delivery quantities of the medium to be delivered and/or which allow an extremely precise indication of the delivery rate. The smallest measurable quantity of the medium to be delivered consists of the quantity corresponding to a rotation of the gear wheel through the angle that exists between two teeth of the gear wheel. This would correspond to the interval between two counted pulses during a rotation of the gear wheel. This volume then also determines the inaccuracy of measurements in the case of large quantities. It is also known as the "tooth space volume". It is also an indication for the overall size of a flow rate sensor.

If for example a quantity has been delivered with 9 such pulses, then the measuring instrument is unable to conclude which proportion of this tooth space volume or minimum volume has flowed through the measuring instrument before the first pulse and after the ninth pulse. The value "9 pulses" therefore stands for a delivered quantity, the volume of which is between slightly more than 8 and almost 10 of these minimum volumes. In the case of small delivery quantities or very slow delivery rates and equally in the case of rapidly changing delivery rates, this is quite a considerable measuring inaccuracy.

This problem has also already been identified and in this respect for example in U.S. Pat. No. 4,641,522 it is proposed that the sensor be disposed such that the movement of both gear wheels may be utilized for measurement. A similar proposal is made in EP 0 741 279 B1, with EP 0 642 001 A2 even proposing a circular arrangement of a complete ring of sensors in order to be able to carry out as many measurements as possible.

The aim of all of these proposals is, by increasing the number of measurements or measuring facilities, to reduce the minimum volume of the relevant medium that is to be delivered between two pulses and hence improve the measuring accuracy. The drawback of all of these arrangements is a considerable build-up of equipment as a result of the additional sensors and the incoming lines needed for them.

Further factors that also have to be considered are that occasionally and depending on concrete actual requirements the measurements also have to be carried out on relatively hot, flowing fluids or gases, that a high outlay for sealing of the instruments is necessary because these fluids or gases may be toxic, flammable or expensive, and that it is quite possible for the fluids and gases also to be aggressive media. All of these factors occasionally add considerably to the complexity and cost of the corresponding equipment.

An attempt is also made to achieve this mechanically by using gear wheels that are as small as possible. However, this then has the drawback that no meaningful processing of large quantities or rapidly flowing fluids, in particular gases, is possible with such measuring instruments.

The object of the present invention is to propose a practicable solution for a flow rate sensor, with which the measuring accuracy may be improved with a lower outlay for equipment.

SUMMARY OF THE INVENTION

This object is achieved by a flow rate sensor having a measuring chamber, into which a medium, the volume and/or flow rate of which is to be measured, can be fed and then discharged, having measuring mechanism elements disposed in the measuring chamber and mounted in a freely rotatable manner, having at least one sensor for measuring magnetic fields and/or variations of magnetic fields, having a circuit device, to which the output signals of the sensor or sensors are supplied, characterized in that the sensor or sensors produce and supply to the circuit device an output signal, which periodically upon each pass of an individual tooth and an associated tooth space of one of the measuring mechanism elements fluctuates between a minimum value and a maximum value and in dependence upon the position of the tooth relative to the sensor or sensors assumes a reproducible intermediate value, and that the circuit device is so designed that it forms from the output signals of the sensor or sensors its own output signals, which convert the intermediate values to countable values that are representative of partial volumes of the volumes delivered between two teeth.

By said means the object is surprisingly achieved. Whereas the basis of the background art was still that a sensor may only indicate that a tooth has just passed under it, according to the invention the signal is more structured and this structure is in turn evaluated. Thus, when the tooth passes the sensor, it is not just a "peak" or digital signal that is produced but a periodic signal that fluctuates between a maximum and a minimum value. For this purpose, a sinusoidal signal is particularly suitable as it may also be displayed practically by suitable magnetic field sensors and allows particularly precise and, at the same time, simple use.

In this case, giant magnetoresistance sensors have proved particularly successful in tests. In another connection, studies have already found that more precise resolutions of positions are possible with sensors that utilize the giant magnetoresistance effect. Thus, DE 296 12 946 U1 proposes a ferromagnetic sensor part with a gear wheel, in which a GMR sensor, i.e. a sensor that utilizes the giant magnetoresistance effect, is disposed frontally in front of a gear wheel. At least theoretically, according to this printed publication, it is then to be possible also to identify a sensor position relative to a tooth or a space.

The "GMR Sensors Data Book" of the NVE Corporation, Eden Prairie, Minn., USA, of April 2003 briefly mentions this possibility in a similar form. Despite the interesting properties of GMR sensors, a realization in flow rate sensors has not yet been considered. The requirements of flow rate sensors are quite different to those of conventional gear sensors. An arrangement radially outside of the gear wheel, i.e. frontally relative to a tooth, is not feasible on spatial grounds alone, especially as generally two gear wheels have to mesh with one another. The pressures in the region of the measuring chamber may be around 60 Mpa to 80 Mpa (600 bar to 800 bar). The fluids to be measured are occasionally aggressive and/or electrically conductive liquids or fluids of extremely changeable and moreover very high or very low temperatures. Experts in the field of flow rate sensors will therefore always resort to sensors that are as insensitive as possible and regarded as safe and reliable. A higher resolution is therefore realized always, as already mentioned above, by a skilful arrangement of the greatest number of known sensors, the measured values of which are compared to one another or nested in one another in order then to obtain from the respective YES/NO data information about the number of delivered whole measuring volumes.

With the solution according to the invention it is however possible to achieve very precise measurement without such a complicated arrangement of a plurality or large number of sensors. According to the invention, the sinusoidal signal therefore runs through a complete sinusoidal oscillation, while a tooth in the course of the movement assumes the position of the preceding tooth. Thus, each value of the sinusoidal oscillation together with the corresponding gradient of the sinusoidal oscillation is capable of clearly indicating where exactly the tooth is situated at a specific instant. A sinusoidal oscillation of 180° therefore corresponds to the delivery of half a tooth space volume; a sinusoidal oscillation of 45° corresponds to the throughflow of an eighth of the tooth space volume.

For the invention it is very advantageous when not just one sensor but at least two sensors are used. It has proved particularly successful when the at least two sensors are fitted on one measuring mechanism element, in particular therefore on the same gear wheel. The arrangement of at least two sensors on one gear wheel has i.a. the advantage that upon reversal of the direction of rotation of the gear wheels an inclusion of the relative play of the gear wheels in the signal pick-up is avoided. These measure, preferably at a distance from one another, the movement of the same measuring mechanism element, i.e. the same gear wheel. Given the use of sinusoidal oscillations, this distance is so selected that the one sensor produces precisely one sinusoidal oscillation, while the other sensor produces one cosinusoidal oscillation, when the same gear wheel rotates. If the same tooth is then scanned, then this corresponds to a relative offset of the two sensors by 90° of the oscillation (from an electrical viewpoint), this being equivalent to a relative offset by a quarter of a tooth pitch.

It would however also be possible to scan two adjacent teeth or two teeth spaced further apart, as the gear wheels are equipped with symmetrically and regularly distributed teeth and therefore the movement of a tooth is always synchronous with the movement of the other teeth on the same gear wheel. Here, for the arrangement, concrete structural requirements may therefore be taken fully into account.

Naturally, in this case it is preferred when the two sensors, given an identical position relative to a tooth, would produce an identical output signal. In the previously described example of a sinusoidal signal and a cosinusoidal signal, this would be the case given a 90° offset. From such signals it is namely automatically possible without considering the gradient of the signals to take the position of the teeth immediately and clearly into account, i.e. a fine subdivision arises. If the position or other combinations of the two sensor measured values are included, then the exact tooth position as well as the direction of rotation of the relevant measuring mechanism element or gear wheel and hence the direction of flow of the medium may be established in an even more defined manner.

It is therefore possible for example also to sum the two sinusoidal signals or cosinusoidal signals in accordance with the addition theorem and then supply the result to comparators. This results in a particularly high resolution. The method in this form of implementation leads to a very high converter frequency and, in accordance with the large number of comparators used, to a high resolution.

As the evaluation by virtue of the summation delivers easily identifiable signals, the association with an angular position of the teeth may be determined very precisely.

A further result is that it is particularly advantageous when the sinusoidal signals or cosinusoidal signals are reproducible and have the same voltage level $U_{ss}$. This makes interpolation particularly feasible.

It is therefore particularly advantageous when the sinusoidal signals or cosinusoidal signals present their sinusoidal characteristic very correctly. The more accurately the characteristic corresponds to a mathematical sine curve, the more precisely the angular position of a tooth may be detected.

In this case, it is particularly advantageous when the sinusoidal characteristic also cannot be influenced by the temperature or the actual flow conditions.

In the background art this was not possible. Each magnetoresistor in differential sensors generated voltages of a differing height and the generated signals could not be held at an identical voltage level. What is more, they did not have a sinusoidal characteristic in the desired sense.

According to the invention, it is further preferred when a pre-amplifier is used as a switching device. The use of a pre-amplifier is in any case meaningful in order to convert the occasionally very small output signals of the sensors to signals that lend themselves better to conversion by an electronic evaluating device, above all when the electronic evaluating device is situated some distance away from the sensors.

The pre-amplifier or switching device in this case is preferably so equipped that it may produce three output signals. Two of these output signals are then mutually offset in each case by half a pulse width. This means that the electronic evaluating device, to which these signals are then supplied, may assign these signals exactly and with very little interference susceptibility and a simple counter may draw conclusions about the original state of the gear wheel or measuring mechanism element.

In a preferred manner, the third output signal in this case generates a pulse when a tooth is moved on by a complete tooth pitch relative to the sensors. This third signal, which may also be described as a zero signal, may be used for synchronization or for the rough measurement of throughflow or volume.

In a method according to the invention, the object is achieved in that the sensor or sensors produce and supply to the circuit device an output signal, which periodically upon each pass of an individual tooth of one of the measuring mechanism elements fluctuates between a minimum value and a maximum value independently of the position of the tooth relative to the sensor or sensors assumes a reproducible intermediate value and that the circuit device forms from the output signals of the sensor or sensor its own output signals, which convert the intermediate values to countable values.

This method, with the advantages described above with regard to the flow rate sensor, presents an excellent solution to the problem.

Practical applications of the invention include for example position measurements of hydraulic cylinders of a small or a large diameter., the generating of characteristic curves as a function of the pressure, temperature or other measured variables of pumps, hydraulic motors, rotary actuators and the like.

The invention is usable not only in gear sensors but also in other flow rate sensors. The term "tooth" in this application accordingly also comprehends comparable elements, for example the spiral rib extending round a screw spindle meter and the like.

DESCRIPTION OF THE DRAWING

There now follows a detailed description of several embodiments of the invention with reference to the drawings. The drawings show.

DETAILED DESCRIPTION

Figure 1:
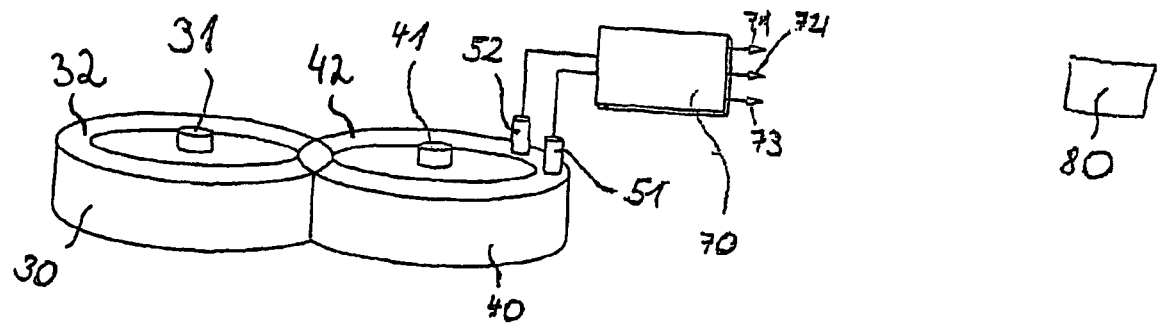
FIG. 1 a perspective schematic diagram of a flow rate sensor according to the invention with schematic evaluating device.

In FIG. 1 the basic principle of the evaluation of the data of a flow rate sensor is illustrated. In a housing a measuring chamber is situated (neither of which are shown). In this measuring chamber a first measuring mechanism element 30, in particular a first gear wheel is to be seen on the left of the diagram. This first measuring mechanism element 30 or first gear wheel is freely rotatable about a vertical axis 31 and at the outside has teeth 32, which are reproduced here in the diagram only as a whole by their envelope curve.

This first measuring mechanism element 30 meshes with a second measuring mechanism element 40 of a substantially identical construction, i.e. in particular a second gear wheel. This is freely rotatable about an axis 41 disposed parallel to the axis 31. The second gear wheel or second measuring mechanism element 40 has teeth 42, of which here too only an envelope curve is illustrated.

The teeth 32 and 42 of the two measuring mechanism elements 30 and 40 mesh with one another in the middle region between the two gear wheels or measuring mechanism elements. As a result, the two measuring mechanism elements 30, 40 rotate in opposite directions.

When a medium, i.e. in particular a fluid is fed into the region upstream or downstream of the mutually meshing teeth 32, 42, it sets the two gear wheels or measuring mechanism elements 30, 40 into the just mentioned oppositely directed rotation and flows at the other side back out of the meshing region. The feed into and discharge from the measuring chamber are omitted here for the sake of clarity. The medium or fluid F cannot flow past the two measuring mechanism elements 30, 40 without passing, in the meshing region, into the chambers formed by the tooth spaces between the mutually meshing teeth 32, 42 and by virtue of displacement moving the teeth 32, 42 in flow direction and hence instigating the rotation. As the volume out of the mutually meshing teeth is exactly defined by the dimensions of the teeth and tooth spaces and of the measuring mechanism elements and is displaced, from the number of rotations of the two gear wheels it is theoretically possible to read precisely which volume or volumetric flow is displaced by the meshing region.

The meshing region between the two measuring mechanism elements or gear wheels always forms a barrier for the medium. The volume of the medium is conveyed from the inlet side to the outlet side in the outer region of the gear wheels. In the meshing region at the outlet side this volume is displaced and hence discharged (displacement principle).

Disposed in the housing around the measuring chamber are two sensors 51, 52. As the measuring chamber and the housing are omitted from the diagram, the two sensors 51, 52 are visible directly above the second measuring mechanism element 40, more precisely above the teeth 42 of the second measuring mechanism element 40. The sensors 51, 52 naturally do not rotate with the measuring mechanism element 40 but are disposed in a fixed manner in the wall of the measuring chamber.

The two sensors 51 and 52 are spaced apart by a distance 90'. These 90" are not to be understood geometrically with regard to the gear wheel or second measuring mechanism element 40 but relate to the passing of an individual tooth 42 below them. A magnetic field is namely built up in this region, wherein the magnetic field is varied by the teeth 42 moving through it. For this purpose, the teeth and the entire measuring mechanism element 40 are of a ferromagnetic design.

As the individual teeth 42 are also identical to one another, a sine curve arises when an individual tooth runs past below one of the two sensors 51, 52, until the following tooth lies exactly in the position of its predecessor and the magnetic field has therefore readopted its original shape.

The second sensor is then therefore offset by 90° in relation to this change. This means that it is offset relative to the first sensor 51 by a quarter of the angle apportioned to a concrete tooth. Given the use for example of a gear wheel having 12 teeth, then to each of these teeth 300 of the circumference of the measuring mechanism element 40 would be apportioned (12×30°=360°). In this case, the two sensors 51 and 52 would be spaced apart from one another on the circumference of the second measuring mechanism element 40 by a quarter of this angle, i.e. by 7.5°.

As the arrangement of the teeth 52 in the first measuring mechanism element 40 is symmetrical, there could also be an angular distance of 37.5° between the two sensors 51 and 52 since, in that case too, because of the periodic properties there would be an angular offset by 450°, i.e. equivalent to 90° relative to an individual tooth.

The two sensors 51 and 52 supply their output signals to a pre-amplifier 70. This pre-amplifier generates from the signals supplied to it three output signals 71, 72 and 73, which are discussed in more detail below. These output signals 71, 72 and 73 are then supplied for further processing to an external electronic device 80.

Because of the periodicity of the magnetic field fluctuations caused by the magnetic field variations, the two sensors 51 and 52 mutually offset by 90° generate a sinusoidal signal and a cosinusoidal signal. From the sinusoidal signal and cosinusoidal signal the pre-amplifier 70 may then generate digital signals 71 and 72 on two channels. In this case, programmed interpolation factors for the resolution of the measuring volumes of the fluid F that are to be determined are situated in the pre-amplifier 70.

A null signal Z is moreover generated as third signal 73. This null signal Z corresponds in each case to a complete sinusoidal oscillation, i.e. the movement of a tooth to such an extent that its place is taken precisely by the following tooth 42.

The signals 71, 72 and 73 are then supplied for further processing to the external electronic evaluating device 80. The electronic evaluating device 80 may then calculate from the actual frequency of the signals the flow quantity or flow rate in relation to time. In this case, by means of a digital counter the electronic evaluating device 80 may simply count the individual pulses supplied to it and then work out from the counter content the processed volume of the relevant fluid.

From the ratio of the sinusoidal signal to the cosinusoidal signal it is possible to identify the precise position and hence the exact angular position of an individual tooth 42. Thus, unlike in the background art, not only the number of teeth is determining, but also intermediate positions. Incomplete movements of a tooth to the next position may therefore also be used for the resolution through a type of interpolation.

Figure 2:
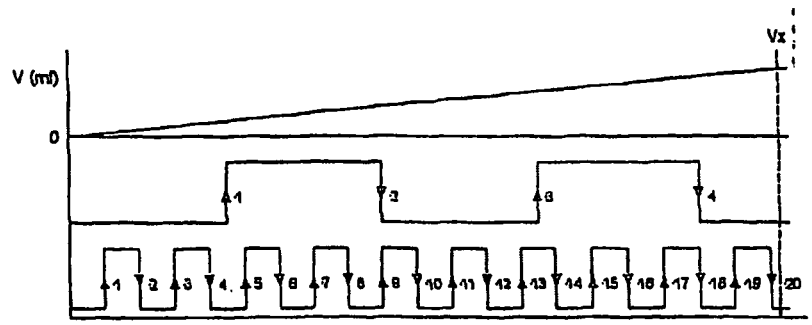
FIG. 2 a schematic diagram illustrating the resolution of the physical variable "volume"

In order to demonstrate which relationship exists between the number of pulses, on the one hand, and the resolution of the physical variables, in FIG. 2 a diagram of the resolution of the physical variable "volume" of the medium to be measured, in particular of a fluid, is reproduced.

Here, the time (t) is plotted from left to right and the diagram is divided from the bottom up into three portions. The top third shows the volume V conveyed in the course of time in milliliters (ml). The middle third shows the behavior given only a low number of possible pulses, and the bottom third shows the behavior given a high number of pulses.

A measure of the resolution of a flow rate sensor is the so-called k-factor. The k-factor indicates the number of pulses per conveyed liter of the medium to be measured. The higher the pulse number per liter of the medium to be measured, the higher the resolution. When the inverse value is formed from the k-factor, the measured volume $V_m$ of the flow rate sensor is directly obtained. The measured volume $V_m$ is therefore derived from the k-factor and, just like it, is a measure of the resolution of the physical variable "volume".

Taking for example the middle third and assuming, there, a practical number of the k-factor $K_g$ of 250 pulses/liter, then one obtains for the measured volume $V_{mg}$ still 0.004 liters/pulse corresponding to 4 ml or 4 cm$^3$/pulse. Partial quantities of this volume are no longer determinable.

In principle, the same naturally applies also in the case of a high resolution having a k-factor $K_h$ of 50,000 pulses/liter. Then, however, the measured volume $V_{mh}$ as an inverse value is 0.00002 liters/pulse corresponding to 0.02 ml/pulse or 0.02 cm$^3$/pulse. Here too, it would then no longer be possible to determine smaller partial quantities, for this however there would be an accuracy of still 0.02 cm$^3$/pulse.

As is easily apparent from FIG. 2, with the rough resolution it is impossible to tell from the number of measured pulses precisely where the flow quantity lies between the still detected fourth pulse and the no longer arisen fifth pulse, whereas in the bottom third with the high resolution a similar accuracy is present much more finely and the inaccuracy consists only of whether the volumetric quantity that has flowed through is nearer to the 20$^{th}$ still effected pulse or the 21$^{st}$ no longer effected pulse.

Viewed precisely, it is a question of the 4$^{th}$ and/or 5$^{th}$ or 20$^{th}$ and/or 21$^{st}$ edge of the pulses. Each pulse has a rising edge and a falling edge. This however in no way alters the relative ratios of the two examples to one another.

Figure 3:
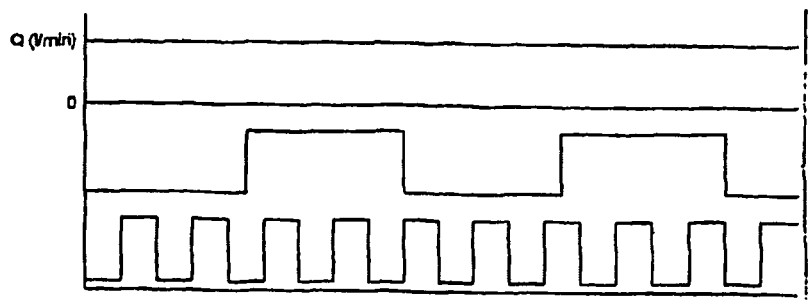
FIG. 3 a schematic diagram illustrating in detail the resolution of the physical variable "flow rate"

The same naturally applies also to the measurement of the flow, for which therefore a comparable diagram is presented in FIG. 3. There too, the time (t) is plotted from left to right, the two bottom thirds show the rough and the high resolution at low and at high frequencies respectively and the top third shows a flow taken here as constant.

Given a flow of for example Q=1 liter/min, the flow rate sensor with rough resolution supplies a frequency of 4.2 Hz (corresponding to $Q/V_{mg}$), whereas with high resolution a frequency of 833.3 Hz ($V/V_{nh}$) arises. If the frequency changes in both cases by 0.5 Hz, then this corresponds with the rough resolution to a change of 11.9% and with the high resolution to a change of 0.0006%. This means that flow changes may be measured much more precisely with the high resolution than is possible with a rough resolution.

In the case of FIG. 3 it naturally has to be considered that as a rule the relevant flow is precisely not constant. It ought to be immediately clear to the person skilled in the art that precisely in the case of a changing flow a larger number of data or pulses then also allows very much more dynamic measurement and faster detection and processing of flow changes that occur.

Figure 4:
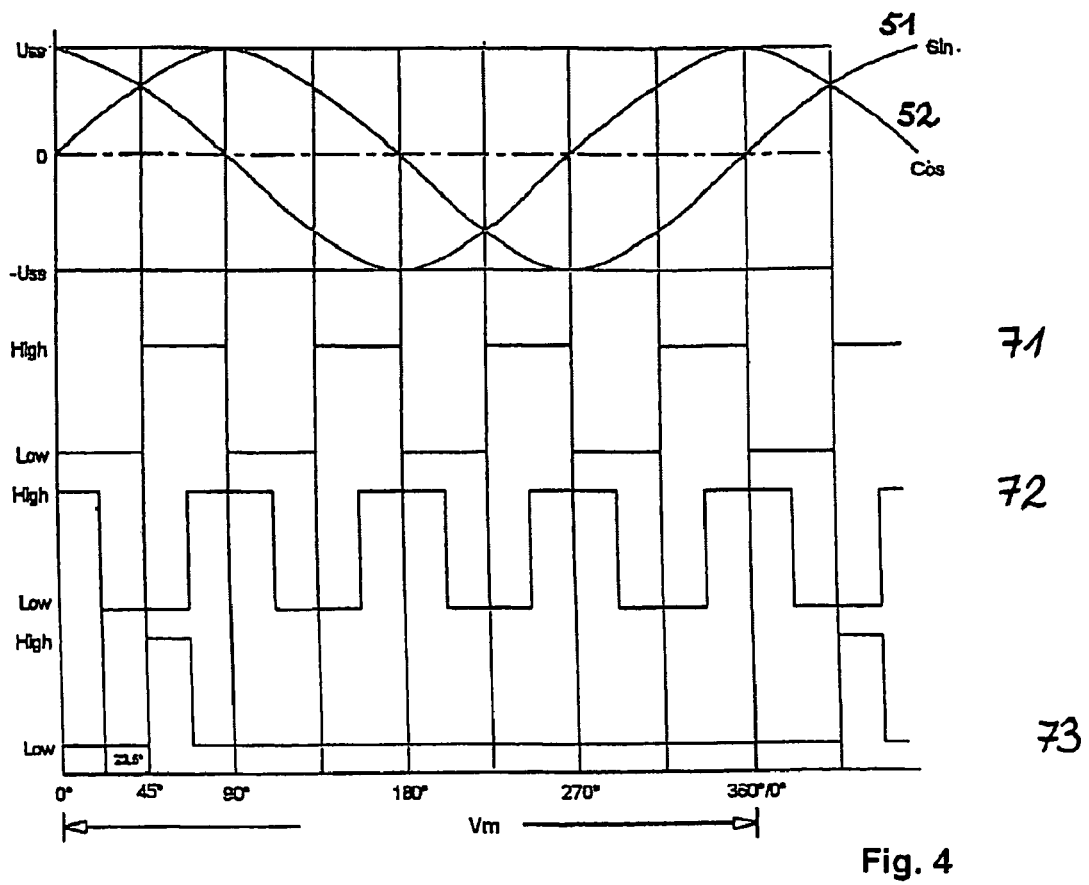
FIG. 4 a schematic diagram showing various measured and evaluated curves in an embodiment.

FIG. 4 now shows a concrete embodiment of how, by means of a flow rate sensor of FIG. 1, with detailed consideration of the sine and cosine functions a markedly improved resolution becomes possible. In this case, the assumption in FIG. 4 is a resolution by the factor 16 compared to a conventional design. The movement of a tooth 42 of the second measuring mechanism element 40 into the position of the preceding tooth, which previously corresponded to the conveying of one measuring volume, may now be resolved into 16 individual partial volumes.

In this case, the conveyed volume of the medium to be measured is indicated from left to right in FIG. 4. As the volume in liters or milliliters or other fractions of cubic meters is dependent. upon the size of the flow rate sensor, as a unit for the scale the movement of the tooth 42 is reproduced, wherein for the movement of precisely one tooth into the position of its predecessor a value of 360° is assumed. This is once more additionally illustrated by means of the range indication for the measuring volume $V_m$ below the x-axis. As already mentioned in connection with FIG. 1, this naturally corresponds to only a fraction of a rotation of the complete gear wheel, dependent on the total number of teeth.

The passing of the tooth 42 under the sensors 51 and 52, as already mentioned, generates a sinusoidal signal of the one sensor 51 and a cosinusoidal signal of the second sensor 52. The pre-amplifier 70 is then able to correlate these two signals. Instead of, as before, detecting only one pulse, it now detects whether the sinusoidal signal is positive or negative, whether it is rising or falling, whether the cosinusoidal signal is positive or negative or whether it is rising or falling. The overshooting or undershooting of specific values within the sinusoidal and cosinusoidal fluctuations or of their gradients may be used.

FIG. 4 also shows the result. While in the top third the two output curves of the sensors 51 and 52 are represented as sinusoidal oscillation and as cosinusoidal oscillation between the maximum values $U_{ss}$ and $-U_{ss}$, below them the three output curves 71, 72 and 73 of the pre-amplifier 70 are shown, namely from top to bottom-first digitally the channel A, then in a similar form the channel B and finally at the bottom the null signal Z corresponding to the output signal 73. As is apparent, this then allows a fine subdivision to 22.5°, i.e. to $\frac{1}{16}$ of the measuring volume $V_m$.

If desired, an even finer subdivision is possible, dependent upon the interpolation factors that break down the sinusoidal and cosinusoidal signals.

The pre-amplifier 70 should comprise output stages, which comprise fast line drivers for the three channels 71, 72 and 73, for example with wave impedance matching for lines of 75 Ω. The output stages may comprise push-pull output stages with a rating for a high driver output of ca. 300 mA at 24 V, which because of the high demands in the event of overtemperature should be short-circuit-proof and which should also possess outputs against "echoes" of mismatched lines. A data transmission with 24 V signals is generally effected without line termination with wave impedance. A mismatched line end may cause reflections that may run back and forth a plurality of times if at the transmitter side there is likewise no matching. Given rapid pulse trains, the transmission is possibly disturbed by these reflections.

Given long connection lines between the pre-amplifier 70 and the electronic evaluating device 80 and given a desire for high resolution, lines with a wave impedance of ca. 40 to 150 Ω should therefore be used and a corresponding terminating resistor should be connected to the electronic evaluating device. Through optimum matching of the transmission line and the terminating wave impedances, maximum line lengths of up to 150 to 200 m may be achieved.

In a preferred manner, the operational reliability may be additionally improved by a high output amplitude and by integrated wave matching. If the signals at the receiving side are conveyed via optocouplers, a galvanic isolation between the transmitting and the receiving side is additionally obtained and potential differences may equally be avoided in this way.

The reflection of returning signals is prevented in the output stage of the pre-amplifier by integrated wave impedance matching. The immunity to interference is increased even more by this matching.

The flow rate sensor according to the invention opens up numerous additional possible applications. The high resolution that is achievable, and hence the large amount of information about the volume rate of flow leads to an improved and more accurate evaluation both of the flow itself and of the conveyed volume.

It is therefore now also possible to measure media of a relatively high viscosity somewhat more accurately. A high viscosity of the medium leads to a relatively large pressure drop in the flow rate sensors. In order to reduce this pressure drop, a flow rate sensor of a larger design than is actually necessary is generally installed. As a result, the flow rate sensor operates only in the bottom measuring range and so, just as discussed, supplies particularly imprecise information. The design according to the invention however allows a substantial increase of the resolution also in such situations, with the result that now media of high viscosity may also be described relatively precisely while being conveyed.

If the flow rate sensors are used as metering devices, then, here too, a much more accurate metering is possible. Depending on the degree of resolution adjusted, very many more pulses are countable than was possible in the background art. This higher resolution then allows a substantially improved and more accurate metering of the volume and hence more precise termination of metering and filling operations. This applies most particularly when the volume to be metered is very low.

The electronic evaluating device 80 calculates the flow rate from the frequency of the signals produced by the pre-amplifier 70. Common frequency measuring methods that may also be used here in flow rate sensors according to the invention are, say, gate time measurement and the pulse width measuring method.

Given the high resolution achievable according to the invention, the pre-amplifier 70 of the flow rate sensor supplies a relatively high frequency that may be evaluated very well. This is particularly advantageous when the evaluation of the frequency is effected using the gate time method. Even given short gate times and low flow quantities, the flow may still be measured to several places after the decimal point. Also advantageous are the short measuring cycle times, which are possible only as a result of the high resolution. This allows a so-called refresh of the measured value at shorter intervals.

If the frequency is measured using the pulse width measuring method, then the flow may be formed from many individual pulses. This leads to an integration of the measured value over a plurality of pulses. Flow fluctuations are therefore processed in a filtered manner and the calculated measured value is no longer subject to fluctuations.

The high resolution according to the invention allows very much faster and more precise determination of flow changes because of the high frequency. The evaluating device therefore obtains much more information from the instantaneous state of the flow. As a result, the measurement is carried out much more dynamically than is possible with conventional instruments. This is effective quite particularly in the case of small fluctuations and flow changes and in the case of measurements in the range of low rates of flow.

Digital control systems may also operate much better and more precisely with the delivered high frequency because the electronic evaluating device 80 is immediately able to detect even small changes of the flow rate and so faults may be corrected without delay.

Figure 5:
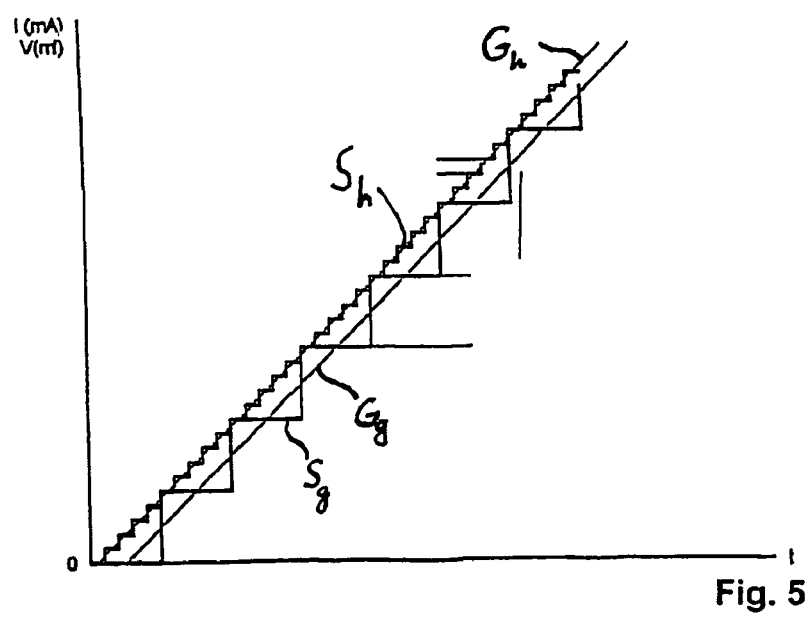
FIG. 5 a schematic diagram of the behavior of an analogue measured value with different resolutions.

FIG. 5 shows how the invention may be used for a conversion of the digital flow value to an analogue measured value. The time (t) is plotted from left to right and the volume in milliliters or the current in milliamperes is plotted in an upward direction. In the graphic itself, the large steps $S_q$ show the resolution produced by converting digital values with few pulses. The lower of the two obliquely extending straight lines $G_q$ then shows a mean value given such a rough resolution.

The small steps $S_h$ show the effects of a high resolution. One increment is then in both cases a measured value change. The mean value in the case of the high resolution with the upper oblique straight line $G_h$ differs from the mean value in the case of the rough resolution, so that an incorrect value with rough resolution is actually corrected with high resolution.

This leads therefore to the major advantage that an analogue measured value may be resolved by means of a digital-to-analogue converter with a large bit number into very many small individual increments. The high resolution then allows the analogue measured value to be reproduced analogously very much more finely, precisely and in small graduations. Furthermore, the analogue output also becomes very dynamic since the distance between the individual increments is only very small and so the analogue measured value may quickly and dynamically follow measured value changes that arise.

Figure 6:
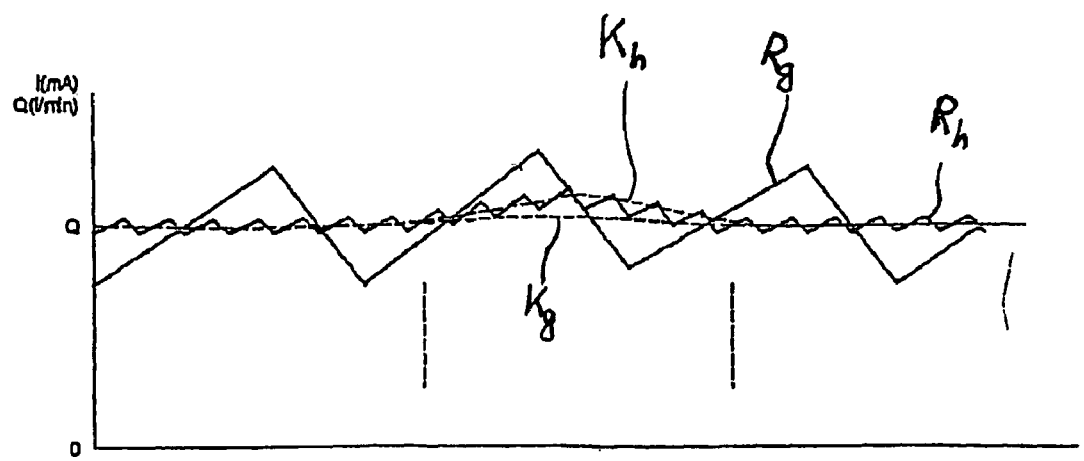
FIG. 6 a schematic diagram of the behavior of measured values with changing flow rates.

This very much more real measured value may show itself even more clearly in the event of fluctuating or changing rates of flow, as FIG. 6 reveals.

If the rate of flow is namely converted to an analogue measured value by a frequency-to-voltage converter, then the analogue value may, given the high resolution, be output very dynamically with a smaller ripple $R_h$, even down into lower frequency ranges. Flow changes may therefore be detected very much faster, so that dynamic operations may be traced and recorded by means of fast Yt recording instruments. Analogue control systems operate much more precisely and accurately, since the control system may react very much faster to a flow change (frequency change). Large overshoots when correcting a fault therefore no longer occur because the control system is already able to react early to the deviation from the setpoint value.

Because of the high frequency the frequency-to-voltage converter, which is preferably a low pass filter, may now be equipped with smaller and faster filters. Delays in the signal conversion are therefore minimized and the measured value conversion is effected with only a very small time delay. Because of the high digital input frequency, the filter stages now no longer have to smooth the digital signal as much as in the background art because the signals come at short intervals. This means that the analogue measured value now in accordance with the invention has only a small ripple $R_h$, as FIG. 6 shows very clearly. Whereas the curve Kg of the rough resolutions with the, in the graphic 3, large ripples $R_q$ hardly correctly identifies the fluctuation arising in the measurement, the high resolution with the small ripple $R_h$ definitely and clearly identifies the hump visible in the graphic, as is evident from the curve $K_h$.

Figure 7:
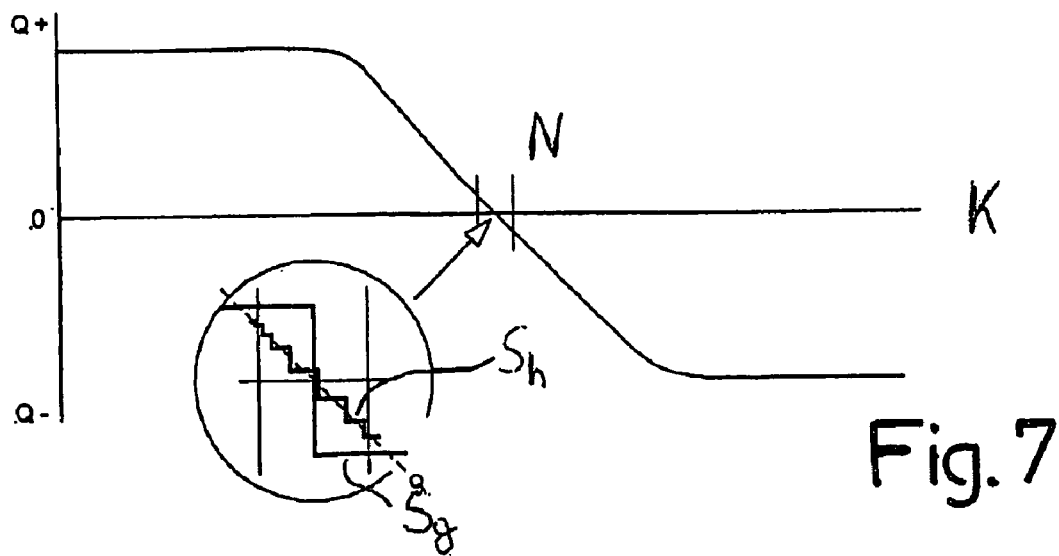
FIG. 7 a schematic diagram of a measurement of a zero passage in directional control valves.

In FIG. 7 a further possible application of the flow rate sensor according to the invention is illustrated. From left to right the piston displacement K of a valve and in an upward direction the (positive or negative) flow quantity is plotted. Visible on the left is the first flow direction, identifiable by a positive volume rate of flow Qr, and on the right the second, opposite flow direction, identifiable by a negative volume rate of flow Q−. Conventional measurement of the flow of a medium at valves has previously often given rise to the problem that the very low volume rate of flow of the medium during the zero passage N can no longer be measured accurately with the previous flow rate sensors. This is due to the rough graduations used to measure the low volume rate of flow during the zero passage. Consequently, the indication of the piston position during the zero passage is also inaccurate.

With flow rate sensors according to the invention, however, a much higher, for example 16-fold resolution of the flow is possible.

Figure 8:
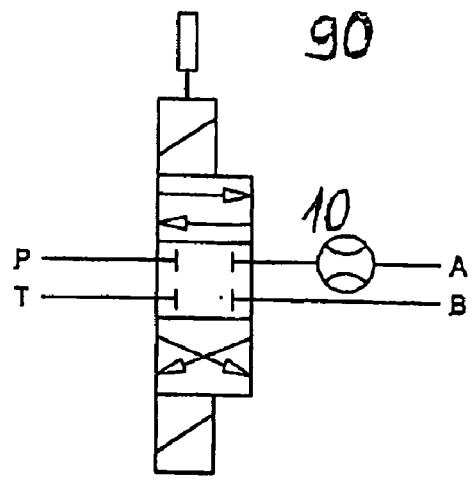
FIG. 8 two schematic diagrams of a measuring set-up of directional control valves.
Figure 8:
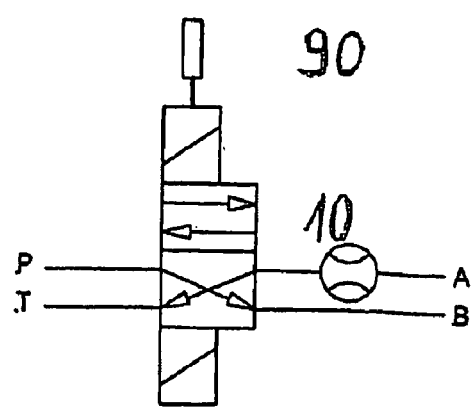

In FIG. 8 an associated measuring set-up is illustrated using the example of two different directional control valves. The top diagram shows a 4/3-way valve with a position pickup 90 and a flow rate sensor 10, the bottom diagram shows a 4/2-way valve with a position pickup 90 and a flow rate sensor 10. The displacement of a control piston is measured by the position pickup 90, while at the same time the respective associated volume rate of flow is measured by the flow rate sensor 10. The two measured values, compared with one another and plotted in FIG. 7, then produce the characteristic there. From the, in FIG. 7 enlarged, illustration of the zero crossing it is clearly apparent that the much higher resolution according to the invention of the flow quantity at the end of inversion now allows a much more precise indication of the piston displacement of the control piston and hence of the influence of the control edges of the valve during the zero passage.

For practical reasons, when setting up a design as in FIG. 8 care should be taken to install the flow rate sensor as close to the valve as possible. Longer connection lines would lead to a delay effect during measurement of the volume rate of flow. It is further recommended that the connection line between the valve and the flow rate sensor be effected by a rigid pipe connection and not by flexible tubes so that the flow rate sensor may measure the volume rate of flow without delay and the measurement result arises simultaneously with the displacement measurement.

LIST OF REFERENCE CHARACTERS

10 flow rate sensor
30 first measuring mechanism element, in particular first gear wheel
31 axis of first measuring mechanism element 30
32 tooth of first measuring mechanism element 30
40 second measuring mechanism element, in particular second gear wheel
41 axis of second measuring mechanism element 40
42 tooth of second measuring mechanism element 40
51 first sensor 52 second sensor
70 pre-amplifier
71 first output signal
72 second output signal
73 third output signal
80 evaluation unit
90 position pickup
$G_g$ straight line with rough resolution
$G_h$ straight line with high resolution
K curve with rough resolution
$K_h$ curve with high resolution
$R_g$ ripple with rough resolution
$R_h$ ripple with high resolution
$S_g$ Step with rough resolution
$S_h$ Step with high resolution

The invention claimed is:

1. Flow rate sensor including a measuring chamber, into which a medium, the volume and/or flow rate of which is to be measured, can be fed, said flow rate sensor comprising:
    measuring mechanism elements disposed in the measuring chamber and mounted in a freely rotatable manner,
    said measuring mechanism elements comprising a first measuring mechanism element that includes a first gear wheel with teeth that meshes with a second measuring mechanism element that includes a second gear wheel with teeth,
    a pair of sensors for measuring magnetic fields and/or variations of magnetic fields,
    said pair of sensors constructed and arranged for mounting in adjacent spaced relationship to only one of said first and second measuring mechanism elements;
    said pair of sensors generating respective separate sinusoidal output signals having predetermined phase therebetween;
    a circuit device, to which the respective output signals of the sensors are supplied,
    wherein the sensors produce and supply to the circuit device respective output sinusoidal signals, and
    wherein the circuit device is constructed and arranged to form, from the output signals of the sensors, countable output values.

2. Flow rate sensor according to claim 1, wherein the circuit device is a pre-amplifier.

3. Flow rate sensor according to claim 1, wherein said pair of sensors are disposed on the periphery of the same measuring mechanism element are preferably offset relative to one another by a quarter of a tooth pitch or by a multiple of a tooth pitch and a quarter of a tooth pitch.

4. Flow rate sensor according to claim 3, wherein the two sensors, given an identical position relative to a tooth, produce an identical output signal, so that because of the offset relative to one another by 90° from an electrical viewpoint, produce signals which are displaced from one another.

5. Flow rate sensor according to claim 1, wherein the output signals of the sensors are sinusoidal oscillations that are dependent upon the movement of the teeth, and which periodically, upon each pass of an individual tooth and an associated tooth space of one of the measuring mechanism elements, fluctuates between a minimum value and a maximum value and in dependence upon the position of the tooth relative to the sensors assumes a reproducible intermediate value.

6. Flow rate sensor according to claim 1, wherein the circuit device produces three output signals of which two output signals are offset relative to one another in each case by half a pulse width and the third output signal generates a pulse each time a tooth is moved on by a full tooth pitch relative to the sensors.

7. Flow rate sensor according to claim 1, wherein at least one of the sensors is a giant magnetoresistance (GMR) sensor.

8. Method of measuring the volume and/or the flow rate of a medium by means of a flow rate sensor, which comprises a measuring chamber including measuring mechanism elements disposed therein and mounted in a freely rotatable manner, said measuring mechanism elements comprising intermeshing first and second measuring mechanism elements, a pair of sensors for measuring magnetic fields and/or variations of magnetic fields, said pair of sensors constructed and arranged for mounting in adjacent spaced relationship to only one of said first and second measuring mechanism elements, said method comprising, providing from said sensors respective separate sinusoidal output signals having predetermined phase therebetween, wherein the sensors produce and supply to the circuit device respective output sinusoidal signals which periodically upon detection by the measuring mechanism elements fluctuates between a minimum value and a maximum value and wherein said circuit device forms, from the output signals of the sensors, countable binary output values.

9. The method according to claim 8, including mounting the sensors on the periphery of the same measuring mechanism element and preferably offset relative to one another by a quarter of a tooth pitch or by a multiple of a tooth pitch and a quarter of a tooth pitch.

10. The method according to claim 9, wherein the two sensors given an identical position relative to a tooth would produce an identical output signal, so that because of the offset relative to one another by 90° from an electrical viewpoint, they produce signals which are displaced.

11. The method according to claim 8, wherein at least one of the sensors is a giant magnetoresistance (GMR) sensor.

12. The method according to claim 8 including, from the output signals from the sensors, measuring the direction of flow of the medium.

13. Flow rate sensor according to claim 3, wherein the output signals of the sensors are sinusoidal oscillations that are dependent upon the movement of the teeth.

14. Flow rate sensor according to claim 4, wherein the output signals of the sensors are sinusoidal oscillations that are dependent upon the movement of the teeth.

15. Flow rate sensor according to claim 2, wherein the circuit device produces three output signals, of which two output signals are offset relative to one another in each case by half a pulse width and the third output signal generates a pulse each time a tooth is moved on by a full tooth pitch relative to the sensors.

16. Flow rate sensor according to claim 3, wherein the circuit device produces three output signals, of which two output signals are offset relative to one another in each case by half a pulse width and the third output signal generates a pulse each time a tooth is moved on by a full tooth pitch relative to the sensors.

17. Flow rate sensor according to claim 4, wherein the circuit device produces three output signals, of which two output signals are offset relative to one another in each case by half a pulse width and the third output signal generates a pulse each time a tooth is moved on by a full tooth pitch relative to the sensors.

18. Flow rate sensor according to claim 3, wherein at least one of the sensors is a giant magnetoresistance (GMR) sensor.

19. Flow rate sensor according to claim 4, wherein at least one of the sensors is a giant magnetoresistance (GMR) sensor.

20. Flow rate sensor according to claim 1, wherein the output signals of the sensors measure the direction of flow of the medium.

* * * * *